(12) United States Patent
McQueary et al.

(10) Patent No.: US 11,200,257 B2
(45) Date of Patent: Dec. 14, 2021

(54) CLASSIFYING SOCIAL MEDIA USERS

(71) Applicant: Securboration, Inc., Melbourne, FL (US)

(72) Inventors: Bruce R. McQueary, Indialantic, FL (US); Craig T. Hagan, Melbourne Beach, FL (US); Robert G. Asfar, Sebastian, FL (US)

(73) Assignee: Securboration, Inc., Melbourne, FL (US)

( * ) Notice: Subject to any disclaimer, the term of this patent is extended or adjusted under 35 U.S.C. 154(b) by 166 days.

(21) Appl. No.: 15/496,328

(22) Filed: Apr. 25, 2017

(65) Prior Publication Data

US 2017/0316082 A1    Nov. 2, 2017

Related U.S. Application Data

(60) Provisional application No. 62/327,169, filed on Apr. 25, 2016.

(51) Int. Cl.
| | |
|---|---|
| *G06F 16/28* | (2019.01) |
| *G06N 5/02* | (2006.01) |
| *G06F 16/9535* | (2019.01) |
| *G06N 20/00* | (2019.01) |
| *G06F 16/901* | (2019.01) |
| *G06Q 50/00* | (2012.01) |

(52) U.S. Cl.
CPC ........ *G06F 16/285* (2019.01); *G06F 16/9024* (2019.01); *G06F 16/9535* (2019.01); *G06N 5/02* (2013.01); *G06N 20/00* (2019.01); *G06Q 50/01* (2013.01)

(58) Field of Classification Search
CPC .......... G06F 17/30867; G06F 17/3053; G06F 17/30598; G06F 16/9024; G06F 16/26; G06F 17/10; G06F 16/285; G06F 16/906; G06F 17/2785; G06F 40/30; G06F 16/353; G06F 16/28; G06N 99/005; G06N 5/02; H04W 4/21; G06Q 50/01
See application file for complete search history.

(56) References Cited

U.S. PATENT DOCUMENTS

| | | | | |
|---|---|---|---|---|
| 2011/0078189 | A1* | 3/2011 | Bonchi | G06Q 10/10 707/776 |
| 2011/0246574 | A1* | 10/2011 | Lento | G06F 16/958 709/204 |
| 2014/0188886 | A1* | 7/2014 | Mahaffey | G06F 16/285 707/740 |

(Continued)

OTHER PUBLICATIONS

Wong et al. "Biological network motif detection: principles and practice", Briefings in Bioinformatics, p. 202-215 (Year: 2011).*

(Continued)

*Primary Examiner* — Yuk Ting Choi
(74) *Attorney, Agent, or Firm* — Danielson Legal LLC

(57) ABSTRACT

Methods and systems for classifying social media users. The system computes a plurality of subgraphs from a user's social graph network and considers which types of subgraphs are overly represented in the user's social network to determine whether a user belongs to a certain class. The system may also consider features based on metadata of the user's network and social interactions occurring in the user's network.

13 Claims, 7 Drawing Sheets

(56) References Cited

U.S. PATENT DOCUMENTS

| | | | | |
|---|---|---|---|---|
| 2014/0280224 A1* | 9/2014 | Feinberg | ............. | G06F 16/9024 |
| | | | | 707/748 |
| 2015/0188941 A1* | 7/2015 | Boshmaf | ............. | H04L 63/1441 |
| | | | | 726/22 |
| 2016/0014151 A1* | 1/2016 | Prakash | ............. | H04L 63/1483 |
| | | | | 726/22 |
| 2016/0350674 A1* | 12/2016 | Midboe | ................ | G06N 99/005 |
| | | | | 726/22 |
| 2017/0185601 A1* | 6/2017 | Qin | ..................... | G06F 17/3053 |
| | | | | 726/22 |

OTHER PUBLICATIONS

Yang et al. "Method for quckily inferring the Mechanisms of large-scale complex networks based on the census of subgraph concentrations", Jrl Syst Sci & Complexity vol. 22: 252-259 , 2009. (Year: 2009).*

Choobdar et al. "Motif Mining in weighted Networks", 2012 IEEE 12th International Conference on Data Mining Workshops, pp. 210-217. (Year: 2012).*

Papaoikonomou et al ."Predicting Edge Signs in Social Networks Using Frequent Subgraph Discovery", IEEE Internet Computing, 2014. (Year: 2014).*

Ali, Waqar, et al., Alignment-free protein interaction network comparison, Bioinformatics, vol. 30 ECCB 2014, p. i430-i437.

* cited by examiner

CLASSIFYING SOCIAL MEDIA USERS

CROSS-REFERENCE TO RELATED APPLICATIONS

The present application claims the benefit of co-pending U.S. provisional application No. 62/327,169, filed on Apr. 25, 2016, the entire disclosure of which is incorporated by reference as if set forth in its entirety herein.

STATEMENT REGARDING FEDERALLY SPONSORED RESEARCH OR DEVELOPMENT

This invention was made with government support under Contract No. W911NF-14-C-0159 awarded by the Army Research Office. The government may have certain rights in the invention.

TECHNICAL FIELD

This invention generally relates to systems and methods for classifying social media users and, more particularly but not exclusively, to systems and methods for classifying social media users based on the structure of their network.

BACKGROUND

Social media platforms have been generating an increasing amount of data that documents, explicitly or implicitly, individuals and their relationships with each other. These relationships are commonly represented by a social network graph comprising a plurality of nodes and links. Individuals in the network can be represented as nodes and relationships between those individuals can be represented as links.

Social network graphs can be broken down into a plurality of subgraphs that represent the relationships among certain nodes. Subgraphs that are more common than random in a network may be statistically significant and are referred to as "motifs."

Usually a motif analysis involves first computing a census of all subgraphs in a network of interest. The next step is to generate random graphs with similar characteristics and perform a similar census on the random graphs to determine which subgraphs are more common in the network of interest versus a random network. However, generating random graphs in this existing technique induces bias, and performing a census on the random graphs increases computation time.

A need exists, therefore, for systems and methods for classifying social media users that overcome these disadvantages.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method for classifying a social media user. The method includes receiving social media data concerning a plurality of users; generating a social graph for a user from the plurality; generating a set of features for the generated social graph; providing the set of features as an input to a trained classifier; and receiving as an output from the trained classifier a classification of the user.

In one embodiment, the method further includes training the classifier using a predetermined set of training data, with each entry in the set of training data associated with a positive or a negative classification.

In one embodiment, the generated social graph includes a plurality of subgraphs, and the features represent a concentration of subgraphs of a predetermined size that are present in the social graph.

In one embodiment, each user in the plurality is associated with user metadata, and the features are derived from the user metadata. In on embodiment, the user metadata is based on at least one of a concentration of the users that are private, a concentration of the users with location data, a concentration of the users with a URL, a concentration of the users with a user description, an average percent usage of description field by a user, a concentration of the users with background images, a concentration of the users with language preference set, and an average contact screen name stability.

In one embodiment, each user in the plurality is associated with interaction data documenting that user's interactions with at least one other user in the plurality, and the features are derived from the interaction data. In one embodiment, the social interaction feature is based on at least one of a concentration of original communications between the user and at least one other user in the plurality, a concentration of communications between the user and at least one other user in the plurality that contain a hashtag, a concentration of users with geo locations, a concentration of communications between the user and at least one other user in the plurality that include media, and a concentration of communications between the user and at least one other user in the plurality that include URLs.

In one embodiment, the received social media data is limited to a specified time window or limited to a predetermined number of the user's most recent interactions with other users in the plurality.

In one embodiment, the method further includes receiving input from an operator that relates to the accuracy of the classification of the social media user, wherein the trained classifier uses the received input for future classifications.

In one embodiment, the method further includes iterating the method of classifying the social media user over time.

According to another aspect, embodiments relate to a system for classifying a social media user. The system includes an interface for receiving social media data concerning a plurality of users; a memory; an analysis module configured to execute instructions stored on the memory to: generate a social graph for a user from the plurality, and generate a set of features for the generated social graph. The system further includes a trained classifier configured to receive as input the set of features and further configured to output a classification of the user.

In one embodiment, the trained classifier is trained using a predetermined set of training data, with each entry in the set of training data associated with a positive or a negative classification.

In one embodiment, the generated social graph includes a plurality of subgraphs, and the features represent a concentration of subgraphs of a predetermined size that are present in the social graph.

In one embodiment, each user in the plurality is associated with user metadata, and the features are derived from the user metadata. In one embodiment, the user metadata is based on at least one of a concentration of the users that are private, a concentration of the users with location data, a concentration of the users with a URL, a concentration of the users with a user description, an average percent usage of description field by a user, a concentration of the users with background images, a concentration of the users with language preference set, and an average contact screen name stability In one embodiment, each user in the plurality is associated with interaction data documenting that user's interactions with at least one other user in the plurality, and the features are derived from the interaction data. In one embodiment, the social interaction feature is based on at least one of a concentration of original communications between the user and at least one other in the plurality, a concentration of communications between the user and at least one other user in the plurality that contain a hashtag, a concentration of users with geo locations, a concentration of communications between the user and at least one other in the plurality that include media, and a concentration of communications between the user and at least one other user in the plurality that include URLs.

In one embodiment, the received social media data is limited to a specified time window or limited to a predetermined number of the user's most recent interactions with other users in the plurality.

In one embodiment, the interface is further configured to receive input from an operator that relates to the accuracy of the classification of the social media user, and the trained classifier is further configured to use the received input for future classifications.

In one embodiment, the system is further configured to iterate the classification of the social media user over time.

According to yet another aspect, embodiments relate to a method for classifying a social media user. The method includes receiving social media data concerning a plurality of users; generating a social graph for a user from the plurality, wherein the generated social graph includes a plurality of subgraphs; generating at least one of a set of motif features that represents a concentration of subgraphs of a predetermined size that are in the social graph, a user metadata feature that is based on metadata related to at least one of the users, and a social interaction feature that is based on interactions between the user and at least one other user in the plurality; providing at least one of the set of motif features, the user metadata feature, and the social interaction feature as input to a trained classifier, and receiving as an output from the trained classifier a classification of the user.

BRIEF DESCRIPTION OF DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
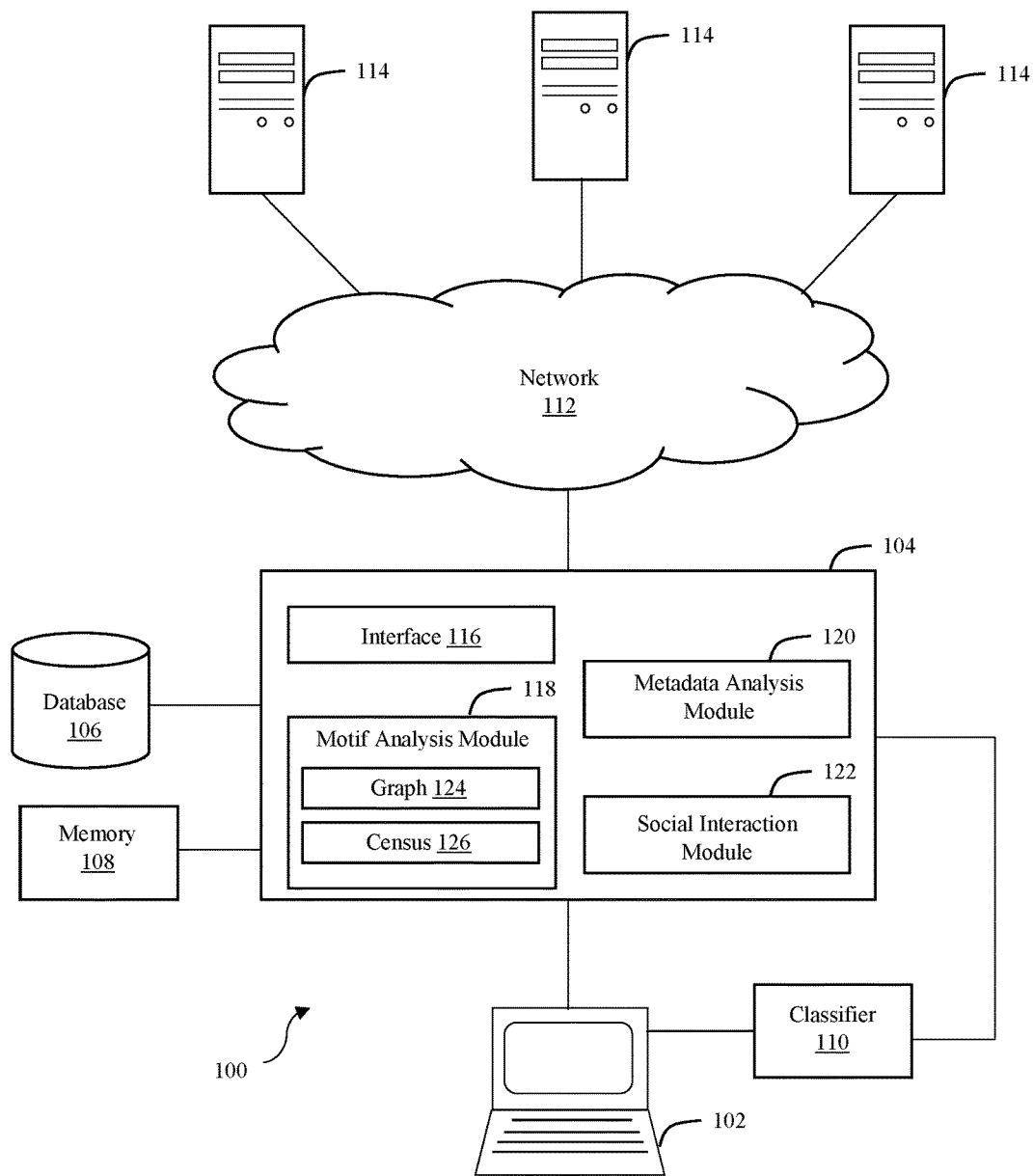
FIG. 1 illustrates a system for classifying a social media user in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Features of various embodiments of the methods and systems described herein may process an overwhelming volume of social media data to find and classify social media users based on at least the structure of their network. The features of the invention may be implemented in conjunction with law enforcement or military operations to find and classify criminal actors. In addition to classifying users, features of the present invention can also classify events or communities.

FIG. 1 illustrates a system 100 for classifying social media users in accordance with one embodiment. The system may include a user interface 102, a processor 104, one or more databases 106, a memory 108, and a classifier 110. The system 100 may include or otherwise be in communication with one or more networks 112 to receive data from one or more data sources 114.

In use, a user such as military or law enforcement personnel (hereinafter "operator") may research a particular person (hereinafter "user") to determine the user's classification according to any number of criterion. The processor 104 may receive various types of data regarding the user from one or more data sources 114. This type of data may relate to the user's social media presence on platforms such as, but not limited to, Facebook, Twitter, Instagram, Snapchat, Reddit, FourSquare, YouTube, or the like. The operator may specify particular social media platforms as well as certain time frames for data retrieval (e.g., an operator may specify they only want to retrieve the last ten Facebook status updates from a particular user).

The processor 104 may then analyze the received data via any one of a motif analysis module 118, a metadata analysis module 120, and a social interaction module 122 to generate one or more features related to the target. The generated feature(s) may then be communicated to the classifier 110. Having previously been trained on training data sets, the classifier 110 may output a classification of the user based on the generated features in accord with its training. For example, a user may be classified as an ISIS sympathizer, a business person, a reporter, a social media bully, bomb maker, government leader, religious leader, scientist, hacker, etc.

The user interface 102 may allow a user to input queries, rules, targets, and other information related to a user of interest. The user interface 102 may be configured as a PC, laptop, smartphone, tablet, smartwatch, or the like. Depending on the embodiment, the user interface 102 may include or otherwise work in conjunction with input/output devices such as a mouse, keyboard, touchpad, touch screen, microphone, or the like to enable the input and output of information to the operator. The exact configuration of the user interface 102 may vary as long as a user can, for example, input data regarding a user and receive data regarding the classification of the target.

The processor 104 (processing device) may be any hardware device capable of executing the various modules 118, 120, and/or 122 to generate features analyzed for the user's classification. The processor 104 may be a microprocessor, a field programmable gate array (FPGA), an application-specific integrated circuit (ASIC), or other similar devices. In some embodiments, such as those relying on one or more ASICs, the functionality described as being provided in part via software may instead be configured into the design of the ASICs and, as such, the associated software may be omitted. The processor 104 may be configured as part of the user interface 102 (e.g., a laptop) or may be located at some remote location. That is, the processing of the user's social media data may be done on a server at a remote location.

The one or more databases 106 may store various types of data regarding previous classifications and users. This may include data such as previous social interactions among users and data regarding users' social media profiles and account information. Similarly, the one or more databases 106 may store data regarding which users have been classified into certain categories.

The memory 108 may be L1, L2, L3 cache or RAM memory configurations. The memory 108 may include non-volatile memory such as flash memory, EPROM, EEPROM, ROM, and PROM, or volatile memory such as static or dynamic RAM, as discussed above. The exact configuration/type of memory 108 may of course vary as long as instructions for executing the various modules 118, 120, and/or 122 to generate the user features can be executed.

The classifier 110 receives and analyzes data from one or more of the modules 118, 120, and 122. Using various clustering or machine learning techniques, the classifier 110 can analyze the received data to determine whether a user belongs to a certain class. For example, the classifier may apply k-fold cross validation techniques to obtain an accurate classification.

The classifier 110 may then output a classification (i.e., whether a user belongs to a certain class or not) to the user interface 102 for presentation to an operator. The classifier 110 may also provide output specifying certain factors or reasons why a classification was made.

The classifier 110 may be similar to commercially available frameworks using various algorithms and statistics to classify new and unknown data elements. These frameworks may include or be similar to Weka, Tensor Flow, NumPy, or any other framework whether available now or created hereafter as long as it can be used to analyze the received features and classify social media users.

The network(s) 112 may link the processor 104 with various data sources 114. The network(s) 112 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The networks 112 may also comprise, include, or interface to any one or more of a Wireless Application Protocol (WAP) link, a Wi-Fi link, a microwave link, a General Packet Radio Service (GPRS) link, a Global System for Mobile Communication G(SM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based link.

Referring back to the processor 104, the processor interface 116 may interface with any one of the data sources 114 to receive social media data regarding one or more users. This data may then be communicated to any one of the modules 118, 120, and/or 122.

The motif analysis module 118 collects or otherwise receives social data relating to the user and the user's friends and followers. For example, if the data is obtained from Twitter, the data may relate to everyone that follows the user. Or, if the data is obtained from Facebook, the data may relate to all of the user's connections or friends.

Figure 2:
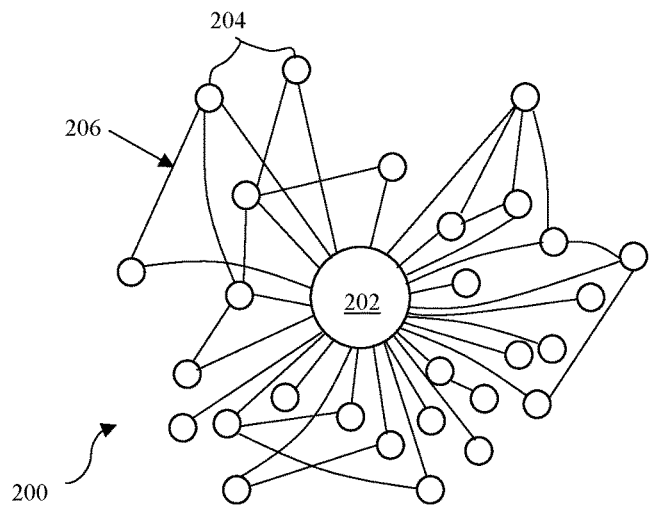
FIG. 2 illustrates a social network graph in accordance with one embodiment.

The motif analysis module 118, namely, the graphing component 124 may generate a social network graph that is based on the received data and represents the user's social network. FIG. 2 illustrates an exemplary social network graph 200 of a user 202. Network graph 200 graphically illustrates the user's relationship with several other people (represented as nodes 204) on the network.

As seen in FIG. 2, a relationship between one or more people in the network is represented as a link 206 that connects two nodes 204. It is noted that the links 206 of graph 200 only represent a relationship between two people and not the direction of that relationship (discussed in more detail below). Also, some users in a network may have a relationship with hundreds or thousands of people in a network, rather than the small number of people illustrated in FIG. 2.

The aggregation of the data is referred to herein as an "ego network." As mentioned previously, this data can be gathered over a window of time (e.g., data from the past ten days) or as a specified number of the latest interactions from each target (e.g., on Twitter, the last 200 statuses from each person in the target's ego network can be collected).

Figure 3:
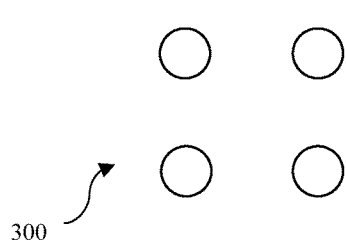
FIG. 3 illustrates a subgraph of size N=4 in accordance with one embodiment.

The motif analysis module 118 may compute the representation of all induced subgraphs of a particular size N in the network of interest, where N is the number of nodes in the subgraph. For example, FIG. 3 illustrates an exemplary subgraph 300 of size N=4. It is noted that subgraph 300 does not indicate any relationships between the nodes. In other words, subgraph 300 illustrates four people, none of which are connected or have a relationship with another.

FIGS. 4A-J, however, illustrate several subgraphs of size N=4 that may exist in a social network. Again, each node may represent a person in a network. FIGS. 4A-J, however, also show directional arrows connecting various nodes. These directional arrows represent the direction of the relationship between nodes.

Figure 4A:
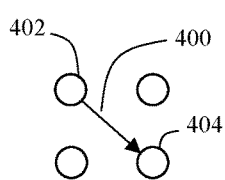
FIGS. 4A-J illustrate a plurality of subgraphs of size N=4 showing exemplary relationships amongst users in a network in accordance with various embodiments.
Figure 4B:
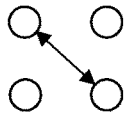
Figure 4C:
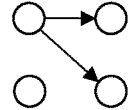
Figure 4D:
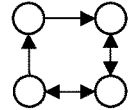
Figure 4E:
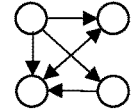
Figure 4F:
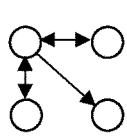
Figure 4G:
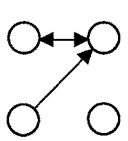
Figure 4H:
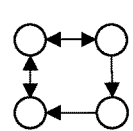
Figure 4I:
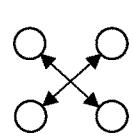
Figure 4J:
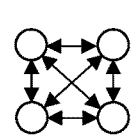

For example, FIG. 4A illustrates a unidirectional arrow 400 connecting node 402 and node 404. This unidirectional arrow 400 not only represents a relationship between nodes (people) 402 and 404, but it also represents the direction of the relationship. Specifically, arrow 400 represents that node (user) 402 is following node (user) 404 on the relevant social media platform.

Several of the subgraphs of FIGS. 4A-J illustrate a single node connected with more than one node. Certain subgraphs also include bidirectional arrows, which indicates that the two interconnected nodes follow each other.

Figure 5A:
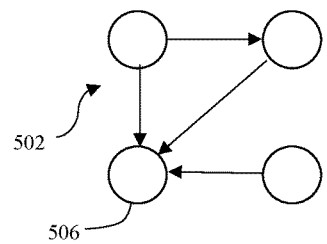
FIGS. 5A-B illustrate subgraphs of size N=4 of influential users in accordance with one embodiment.
Figure 5B:
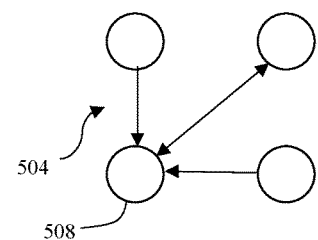

It is also noted that a node representing an influential person will have a high number of incoming links and comparatively few outgoing links. FIGS. 5A and 5B represent two exemplary subgraphs 502 and 504, respectively. In FIG. 5A, node 506 may represent an influential person, as the three other nodes all follow node 506 while node 506 does not follow any of the other nodes. Similarly, node 508 of FIG. 5B is followed by three nodes, and only follows one of the other nodes.

In some embodiments the graphs may be undirected. That is, a node may be connected with another node but the connection does not indicate the direction of the relationship. The motif analysis module 118 may simply transform the graph and make an undirected edge a pair of directed edges that point in opposite directions. Or, the census may be computed on the undirected graphs without performing the transformation.

After generating the social graph, the motif analysis module 118 may then compute a census of all subgraphs of size N in the social graph. In one embodiment, the motif analysis module 118 considers subgraphs of size 4 such as those in FIGS. 3-5. For subgraphs of size N=4, there are 199 possible unique subgraphs (ten of which are illustrated in FIGS. 4A-J). Subgraphs of other sizes are possible and are limited only by computing constraints.

Figure 6:
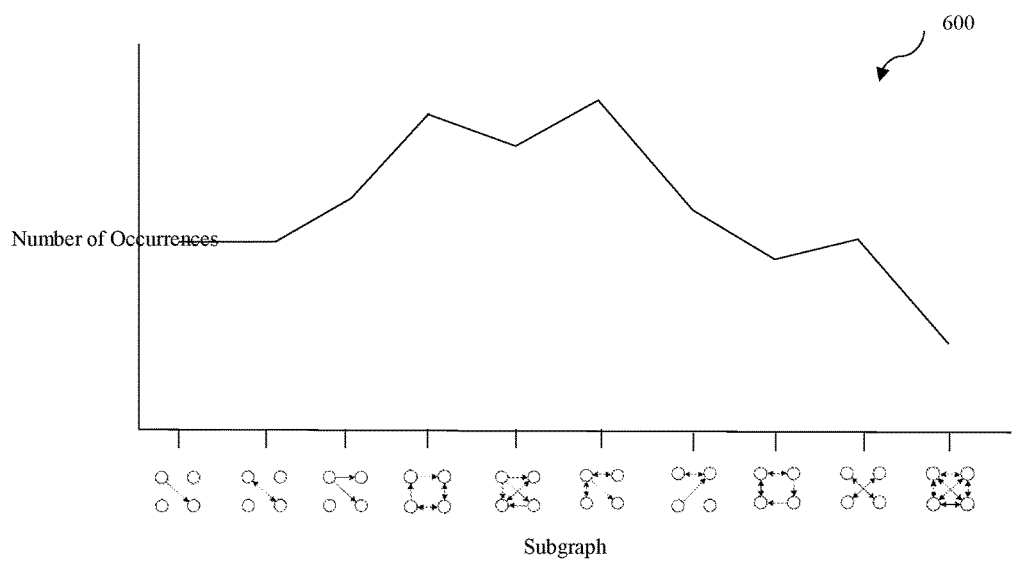
FIG. 6 depicts a graph illustrating the occurrences of various subgraphs in a network in accordance with one embodiment.

The census component 126 counts how many of each possible N size subgraphs exist in the social graph of a user's ego network. The graphing module 124 may then plot the number of occurrences of each subgraph in the network. For example, FIG. 6 illustrates an exemplary graph 600 that shows the number of occurrences of each of the subgraphs of FIGS. 4A-J in a sample network. The number of occurrences is shown on the y-axis of the graph 600, and the various subgraphs of FIGS. 4A-J are shown on the x-axis of the graph 600.

Figure 7:
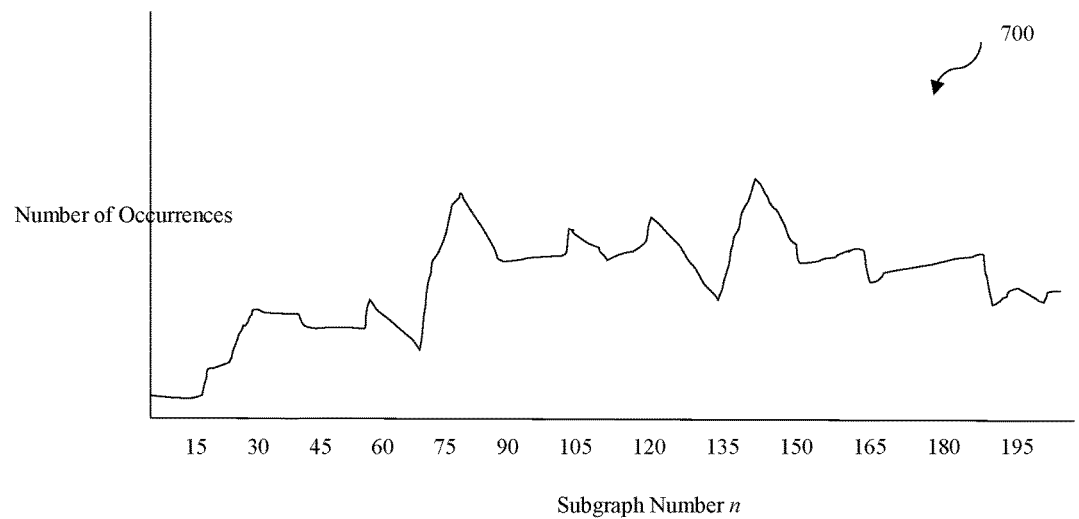
FIG. 7 depicts a graph illustrating the occurrences of various subgraphs in a network in accordance with another embodiment.

The graph 600 of FIG. 6 is merely exemplary and only shows the occurrences of ten possible subgraphs. As mentioned previously, for subgraphs of size N=4, there are 199 possible unique subgraphs. Each of these 199 possible subgraphs may be designated by a number n where $1 \leq n \leq 199$. FIG. 7 illustrates a graph 700 that plots the number of occurrences of each n subgraph. As can be seen in FIG. 7, certain subgraphs are highly present in a network (and are therefore motifs, i.e., subgraphs that are more common than random and distinguish a network) compared with other subgraphs.

One of ordinary skill will also recognize that the graphing of subgraph frequencies, while useful for illustrative purposes, is not necessary to the operation of the present invention. The frequency of various subgraph occurrences may be expressed additionally as or uniquely as a vector of numbers which may then be provided to a classifier as discussed further below.

As mentioned previously, networks of influential people will tend to have subgraphs with many incoming arrows (links) and comparatively few outgoing links. It follows that the concentration for all subgraphs with links pointing inward will be overly represented and hence be a "motif" compared to the social network of a non-influential individual.

The plotted line of graph 700 is essentially analogous to a fingerprint showing which subgraphs are highly present (and are therefore considered motifs) and which are not. The graph 700 may be compared to a model that represents a user of a certain class. If enough of the occurrence values are similar (e.g., within a margin of error), the target may be considered to be a member of a particular class.

This process is analogous to comparing two keys side by side to see if the cuts of the key match. A model is analogous to a lock that will accept a key with similar cuts (e.g., within a margin of error). For example, if an unknown network (e.g., a user's network) fits the model, then the user may be considered as part of the class defined by the model.

In conjunction with computing the occurrence values for each subgraph, the motif analysis module 118 may compute a concentration value for each possible subgraph shape. The concentration value $F_i$ for each subgraph shape may be defined by:

$$F_i = \frac{C_i}{\sum_{k=1}^{m} C_k} \quad \text{(equation 1)}$$

where:
m is the number of possible unique subgraph shapes.
$F_i$ is the feature value/concentration for the ith subgraph shape.
$C_i$ is the number of times the ith subgraph shape occurs in the ego network.

A mentioned previously, for subgraphs of size N=4, there are m=199 possible subgraph shapes. Therefore, the concentration analysis using equation 1 above would produce 199 features that are each valued between 0 and 1. It is noted that subgraphs that do not appear at all in the census will have a value of 0.

The output of the motif analysis module 118 is therefore a set of features that each represents a value regarding how highly represented each possible subgraph of size N is in the network. The set of features may then be communicated to the classifier 110.

The motif features may be complemented with an analysis of metadata associated with the target's preferences and the preferences of the target's network. Additionally, this may include data regarding how the users in the network communicate.

The second set of features may be referred to as the metadata analysis features. These features relate to the user's settings and preferences in their network. Table 1 lists a plurality of exemplary types of data and information that may relate to the user's network settings or preferences:

TABLE 1

Exemplary metadata analysis features
Metadata Features

| | |
|---|---|
| Concentration of private users | Concentration of users with location data |
| Concentration of people with URI ("1" for a user if their metadata containers a URL like a home page) | Average Network person background white ratio (divide person's background color by White and average result over network) |
| Average Network Person's foreground white ratio (divide person's foreground color by White and average result over network) | Ego user background white ratio |
| Ego user foreground white ratio | Concentration of users with a Description |
| Average percent usage of Description field | Concentration of users with background pictures |
| Concentration of users with Time zone set | Concentration of users with language preference set |
| Concentration of users with picture set | Ego user screen name stability (e.g., 1 divided by the number of different screen names user has used) |
| Average network user screen name stability | Ego user description stability (1 divided by the number of different descriptions the user has used) |
| Average network user description stability | Ego user profile image stability (1 divided by the number of different images the user has used) |
| Average network user profile image stability | Ego user background image stability (1 divided the number of different background images the user has used) |
| Average network user background image stability | Ego user background color stability (1 divided by the number of different background colors the user has used) |
| Average network user background color stability | Ego user foreground color stability (1 divided by the number of different foreground colors the user has used) |
| Average network user foreground color stability | |

The motif features may also be complemented with analysis of social interaction data associated with the target and the users in the network. Table 2 lists a plurality of types of social interaction data and information that may relate to the users' social interactions on the network:

TABLE 2

Exemplary social interaction data
Social Interaction Features

| | |
|---|---|
| Concentration of inter-network communications (this is based on the concentration of messages that reference a user in the ego network) | Concentration of broken URL links in communications |
| Concentration of original communications (this is computed by dividing the number of messages that are resent by the total number of messages) | Concentration of inter-network communications from ego user/target (value is 0 if there are no messages from ego user/target) |
| Concentration of communications containing a hashtag | Concentration of original communications from ego user/target (0, if no messages) |
| Concentration of communications with geo-locations | Concentration of communications with hashtags from ego user/target (0, if no messages) |
| Concentration of communications containing media (picture/video) | Concentration of communications with URLs from ego user/target (0 if no messages) |
| Concentration of communications containing URLs (e.g., links to a webpage) | Percent bandwidth used by ego user (0 if no messages) |
| Percent bandwidth usage (this is computed by dividing the average number of characters used in each message by the maximum allowed per message) | Concentration of broken URL links in communications from ego user (0 if no message) |
| Average normalized UTC time of messages (this is computed by normalizing the message time by dividing the time by 24 hours) | Standard deviation of normalized UTC time of messages |

Each feature in Table 1 and 2 may computed in a similar manner as the motif features resulting in a concentration value or as averages of ratios based on a maximum field value. Additionally, each value is normalized to a value between 0 and 1. This ensures no feature will be valued significantly more than any other and also reduces bias due to the size of the network.

If a particular social media platform does not provide a particular type of data, or if a particular type of data is missing, then all values for that particular type of data may be set to 0. This generally will not hinder the operation of a classifier as the field will be discounted by the classifier because all data points will have the same "0" value.

Figure 8:
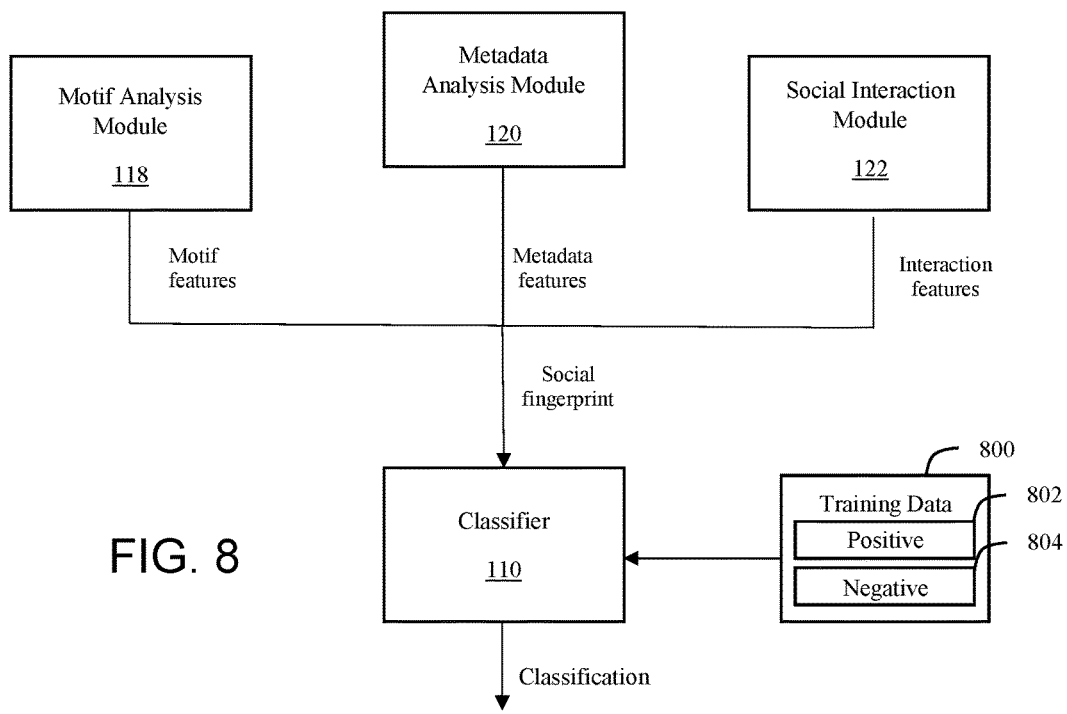
FIG. 8 illustrates the various modules providing data to the classifier of FIG. 1 in accordance with one embodiment.

Once the data is computed by the various modules 118, 120, and 122, the features can be combined into one or more numeric vectors that represent a social fingerprint for a user. The one or more numeric vectors serving as a social fingerprint may be communicated to the classifier 110 as illustrated in FIG. 8.

The classifier 110 may be previously trained by supervised learning to recognize a certain type of social media user. FIG. 8 illustrates a training set of data 800 being communicated to the classifier 110. More specifically, the training data 800 may include a positive set of training data 802 and a negative set of training data 804. The positive training data 802 may represent data relating to one or more members of a certain class, and the negative training data 1004 may represent data relating to one or more non-members of that class. The received training data may be in the form of feature vectors.

The training data (i.e., the training feature vectors) may be used to train the classifier 110 using clustering or machine learning tools. This produces a model that can be used to classify new users of interests. It is noted there may be multiple models created and used (e.g., one or more models for each class of users to classify).

With one or more models trained, data for new users can be collected and processed into feature vectors as described above and supplied to the classifier 110. The classifier 110 may then provide an output indicating whether a user belongs to a particular class via a user interface 102 to an operator.

Additionally, the classifier 110 can be updated with each classification. As new users are classified, the classifier 110 can be improved to consider new instances of positive and negative classifications. The classifier 110 may also accept feedback from an operator concerning correct and incorrect classifications to improve the classifier 110.

Figure 9:
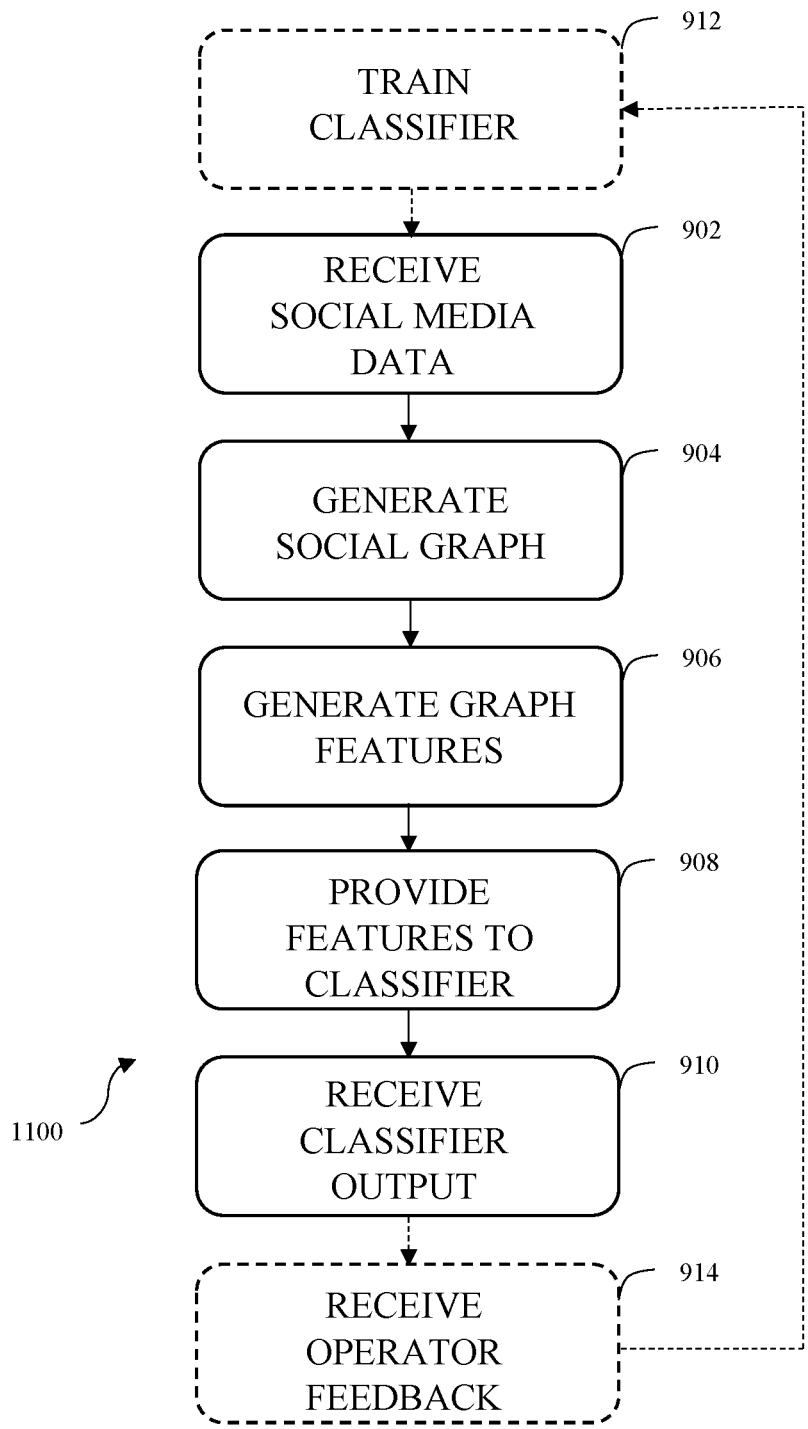
FIG. 9 depicts a flowchart of a method for classifying a social media user in accordance with one embodiment.

FIG. 9 depicts a flowchart of a method 900 for classifying a social media user in accordance with one embodiment. For example, an administrator, government official, law enforcement official, or the like (i.e., an operator) may research a particular individual who may or may not be suspected of being in a certain class.

Step 902 of method 900 involves receiving social media data concerning a plurality of users. The operator may specify particular social media platforms from which to receive data. For example, data may be retrieved from social media platforms such as Facebook, Twitter, Pinterest, Instagram, Snapchat, or the like. The exact social media platforms used may vary and may include platforms in addition to or in lieu of those mentioned above, as well as any combinations thereof.

Step 904 involves generating a social graph for a user from the plurality. This graph may be similar to the graph of FIG. 2, which illustrates an exemplary social graph showing a particular user's relationship with many other users in a network.

Step 906 involves computing a set of features for the generated social graph. These features may relate to a plurality of generated subgraphs such as those illustrated in FIGS. 3, 4A-J, and 5A-B. As mentioned previously, a census may be computed that counts how many of each possible subgraph is present in the user's generated social graph. Subgraphs that are highly present are referred to as motifs. Accordingly, the method 900 of FIG. 9 considers the structure of a user's network and interactions occurring in the network thereby allowing for a content and language-agnostic classification.

It is noted that in the method 900 of FIG. 9 only features regarding the network graph (and subgraphs) are considered. In other embodiments, features based on metadata and/or social interaction data may be considered. Features based on metadata may be based on the data listed in Table 1, and features based on social interaction may be based on the data listed in Table 2.

Step 908 involves providing the set of features as input to a trained classifier. Accordingly, in some embodiments the method 1100 may further include the step of training a classifier using a predetermined feature data (Step 912). The classifier may be trained on a data set that includes a positive training set of data (i.e., data related to one or more members of a class) and a negative training set of data (i.e., data related to one or more non-members).

Step 910 involves receiving as an output from the trained classifier a classification of the user. The classifier may implement various clustering or machine learning techniques to classify the user represented by the set of feature(s) based on the training set of data. The classification of the user may be presented to an operator via a user interface such as the user interface 102 of FIG. 1.

Step 914 is optional and involves receiving feedback from an operator that relates to the accuracy of the classification of the user. An operator may provide additional information that may relate to whether or not the user is part of a class. This feedback may similarly be used in future classifications in an effort to more accurately classify users in future iterations.

The method 900 may be iterated as many times as required for future users and future classifications. Over time, new instances of user classifications may be considered to further enhance the accuracy of the classification method.

Figure 10:
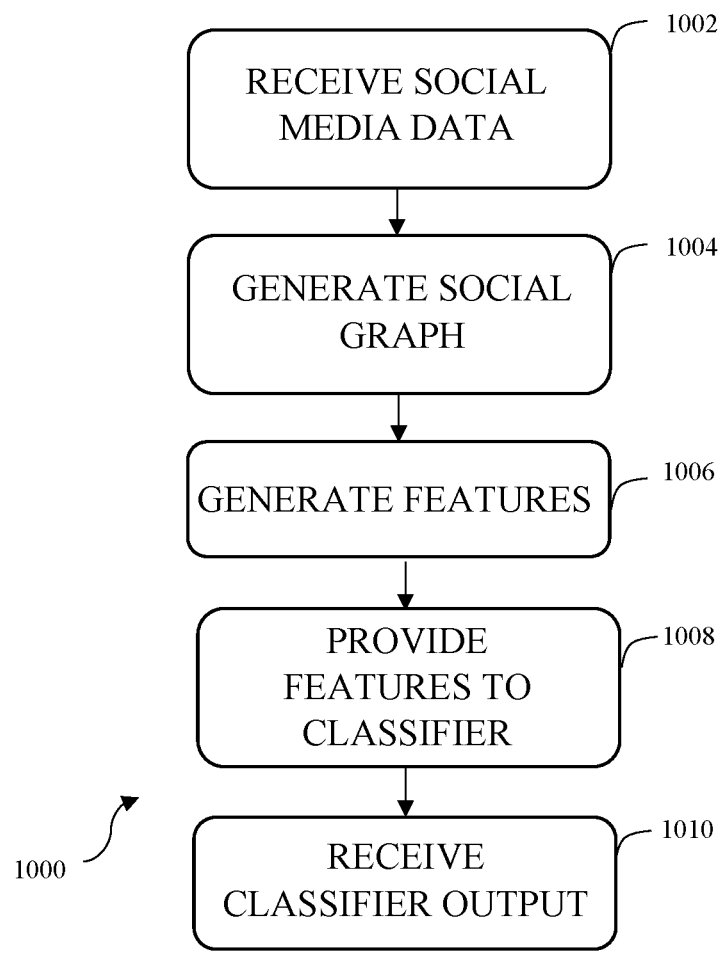
FIG. 10 depicts a flowchart of a method for classifying a social media user in accordance with another embodiment.

FIG. 10 depicts a flowchart of a method 1000 for classifying a social media user in accordance with another embodiment. Steps 1002 and 1004 are substantially similar to steps 902 and 904, respectively, of FIG. 9 and are not repeated here.

Step 1006 involves generating at least one of a set of motif features that represents a concentration of subgraphs of a predetermined size that are in the social graph; a user metadata feature that is based on metadata related to at least one of the users; and a social interaction feature that is based on interactions between the user and at least one other user in the plurality. The motif features may relate to which subgraphs are highly present in a social graph. The user metadata features may relate to metadata associated with the user's preferences and those of the users in the network. The social interaction features may be based on interactions occurring the in the network.

Step 1008 involves providing at least one of the features as input to a trained classifier. The classifier may be trained on a training set of data that considers different training features. These training features may include a positive set and a negative set as discussed previously. Regardless of which feature or features are used, the classifier may implement various clustering or machine learning techniques to determine whether the user is part of a certain class.

Step 1010 involves receiving as an output from the trained classifier a classification of the user. As discussed above, this classification may be presented to an administrator via an interface.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method for classifying a social media user, the method comprising:
receiving social media data concerning a plurality of human users, wherein each of the human users is associated with an ego network and is associated with user metadata, wherein the received social media data is limited to a specified time window or limited to a predetermined number of a human user's most recent interactions with other human users in the plurality;

generating a social graph of the human user's ego network, wherein the generated ego network has a known number of possible directed subgraphs;

determining a number of occurrences of each of the possible directed subgraphs in the generated ego network;

generating a vector of the occurrence values of each possible subgraph of the generated ego network;

deriving a set of features from the user metadata;

updating the generated vector to include the set of features derived from the user metadata;

providing the generated vector as input to a trained classifier;

receiving as an output from the trained classifier a classification of the human user;

assigning the human user to a human sub-class in accordance with the received classification; and updating the trained classifier based on user feedback regarding accuracy of the assignment of the human user to the human sub-class.

2. The method of claim 1, further comprising training the classifier using a predetermined set of training data, with each entry in the set of training data associated with a positive or a negative classification of a human sub-class.

3. The method of claim 1, wherein the user metadata is based on at least one of a concentration of the human users that are private, a concentration of the human users with location data, a concentration of the human users with a URL, a concentration of the human users with a user description, an average percent usage of description field by a human user, a concentration of the human users with background images, a concentration of the human users with language preference set, and an average contact screen name stability.

4. The method of claim 1, wherein each human user in the plurality of human users is associated with interaction data documenting that human user's interactions with at least one other human user in the plurality, and the method further includes deriving a social interaction feature from the interaction data and providing the social interaction feature to the trained classifier.

5. The method of claim 4, wherein the social interaction feature is based on at least one of a concentration of original communications between the human user and at least one other human user in the plurality, a concentration of communications between the human user and at least one other human user in the plurality that contain a hashtag, a concentration of human users with geo locations, and a concentration of communications between the human user and at least one other human user in the plurality that include URLs.

6. The method of claim 1, further comprising iterating the method of classifying the social media human user over time.

7. A system for classifying a social media user, the system comprising:

an interface for receiving social media data concerning a plurality of human users, wherein each of the human users is associated with an ego network and is associated with user metadata, wherein the received social media data is limited to a specified time window or limited to a predetermined number of a human user's most recent interactions with other human users in the plurality;

a memory;

an analysis module configured to execute instructions stored on the memory to:

generate a social graph of the human user's ego network, wherein the generated ego network has a known number of possible directed subgraphs, determine a number of occurrences of each of the possible directed subgraphs in the generated ego network, and generate a vector of the occurrence values of each possible subgraph of the generated ego network;

derive a set of features from the user metadata;

update the generated vector to include the set of features derived from the user metadata; and a trained classifier configured to receive as input the generated vector and further configured to output a classification of the human user, wherein the analysis module is further configured to assign the human user to a human sub-class in accordance with the received classification, wherein the trained classifier is updated based on user feedback regarding accuracy of the assignment of the human user to the human sub-class.

8. The system of claim 7, wherein the trained classifier is trained using a predetermined set of training data, with each entry in the set of training data associated with a positive or a negative classification of a human sub-class.

9. The system of claim 7, wherein the user metadata is based on at least one of a concentration of the human users that are private, a concentration of the human users with location data, a concentration of the human users with a URL, a concentration of the human users with a user description, an average percent usage of description field by a human user, a concentration of the human users with background images, a concentration of the human_users with language preference set, and an average contact screen name stability.

10. The system of claim 7, wherein each human user in the plurality of human users is associated with interaction data documenting that human user's interactions with at least one other human user in the plurality, and the analysis module is further configured to derive a social interaction feature from the interaction data and provide the social interaction feature to the trained classifier.

11. The system of claim 10, wherein the social interaction feature is based on at least one of a concentration of original communications between the human user and at least one other in the plurality, a concentration of communications between the human user and at least one other human user in the plurality that contain a hashtag, a concentration of human users with geo locations, a concentration of communications between the human user and at least one other in the plurality that include media, and a concentration of communications between the human user and at least one other human user in the plurality that include URLs.

12. The system of claim 7, wherein the system is further configured to iterate the classification of the social media human user over time.

13. A method for classifying a social media user, the method comprising:

receiving social media data concerning a plurality of human users, wherein each of the human users is associated with an ego network and is associated with user metadata, wherein the received social media data is limited to a specified time window or limited to a predetermined number of a human user's most recent interactions with other human users in the plurality;

generating the social graph of a human user's ego network, wherein the generated ego network has a known number of possible directed subgraphs;
determining a number of occurrences of each of the possible directed subgraphs in the generated ego network;
generating a user metadata feature that is based on metadata related to at least one of the human users; and
generating a social interaction feature that is based on interactions between the human user and at least one other human user in the plurality, wherein the interactions between the human use and the at least one other human user in the plurality is represented as directed subgraphs;
generating a vector of the occurrence values of each possible subgraph for the user, the user metadata feature, and the social interaction feature;
providing the generated vector as input to a trained classifier;
receiving as an output from the trained classifier a classification of the human user;
assigning the human user to a human sub-class in accordance with the received classification; and
updating the trained classifier based on user feedback regarding accuracy of the assignment of the human user to the human sub-class.

* * * * *